US012742670B2

(12) United States Patent
Pan et al.

(10) Patent No.: US 12,742,670 B2
(45) Date of Patent: Sep. 22, 2026

(54) CORIOLIS MASS FLOWMETER USING BUILT-IN SUPPORTING STRUCTURE

(71) Applicants: WALSN MEASUREMENT & CONTROL TECH (HEBEI) CO., LTD, Langlang (CN); WALSN LIMITED, Canterbury (GB)

(72) Inventors: Juguang Pan, Langfang (CN); Chunli Ma, Langlang (CN); Baoyuan Shang, Langlang (CN); Tao Wang, Langlang (CN)

(73) Assignees: WALSN MEASUREMENT AND CONTROL TECHNOLOGY (HEBEI) CO., LTD, Langfang (CN); WALSN LIMITED, Canterbury (GB)

( * ) Notice: Subject to any disclaimer, the term of this patent is extended or adjusted under 35 U.S.C. 154(b) by 256 days.

(21) Appl. No.: 18/723,034

(22) PCT Filed: Jun. 10, 2022

(86) PCT No.: PCT/CN2022/098041
§ 371 (c)(1),
(2) Date: Jun. 21, 2024

(87) PCT Pub. No.: WO2023/165045
PCT Pub. Date: Sep. 7, 2023

(65) Prior Publication Data

US 2025/0060235 A1 Feb. 20, 2025

(30) Foreign Application Priority Data

Mar. 2, 2022 (CN) ......................... 202210212198.4

(51) Int. Cl.
*G01F 1/84* (2006.01)
*G01F 15/18* (2006.01)

(52) U.S. Cl.
CPC .......... *G01F 1/8409* (2013.01); *G01F 1/8477* (2013.01); *G01F 15/18* (2013.01)

(58) Field of Classification Search
None
See application file for complete search history.

(56) References Cited

U.S. PATENT DOCUMENTS 8,677,832 B2 * 3/2014 Wang .................... G01F 1/8477
73/861.355
10,705,055 B2 * 7/2020 Zhu ......................... G01F 25/10
(Continued)

FOREIGN PATENT DOCUMENTS

CN 1153295 A 7/1997
CN 1426531 A 6/2003
(Continued)

OTHER PUBLICATIONS

International Search Report for PCT/CN2022/098041 issued by CNIPA (China National Intellectual Property Administration) on Nov. 16, 2022.

*Primary Examiner* — Andre J Allen
(74) *Attorney, Agent, or Firm* — AVEK IP, LLC

(57) ABSTRACT

Systems embodiments of the disclosure provide a Coriolis mass flowmeter with a built-in supporting structure. In some examples, the Coriolis mass flowmeter includes a first flow divider, a second flow divider, a support tube, a first case, a second case, and a flow tube. One end of the flow tube is connected to the first flow divider, and another end of the flow tube is connected to the second flow divider. The first flow divider and the second flow divider are fixed by the support tube, the first case is connected to the first flow divider and the second flow divider, the second case is connected to the first flow divider and the second flow divider, the first case is connected to the second case, and the
(Continued)

first case and the second case are wrapped around the support tube and the flow tube.

5 Claims, 2 Drawing Sheets

(56) References Cited

U.S. PATENT DOCUMENTS

| | | | | |
|---|---|---|---|---|
| 12,287,230 | B2 * | 4/2025 | Wang | G01F 1/8409 |
| 2012/0167697 | A1 * | 7/2012 | Rieder | G01F 1/8413<br>73/861.357 |

FOREIGN PATENT DOCUMENTS

| | | | | | |
|---|---|---|---|---|---|
| CN | 104101394 | A | | 10/2014 | |
| CN | 104406645 | A | | 3/2015 | |
| CN | 108180955 | A | | 6/2018 | |
| CN | 109470322 | A | * | 3/2019 | G01F 1/84 |
| CN | 110388967 | A | | 10/2019 | |
| CN | 114812715 | A | | 7/2022 | |
| CN | 217504883 | U | * | 9/2022 | |
| CN | 217504884 | U | * | 9/2022 | |
| DE | 102009055069 | A1 | * | 6/2011 | G01F 1/8409 |
| DE | 102010000760 | A1 | * | 7/2011 | G01F 1/8477 |
| DE | 102022134037 | A1 | * | 6/2024 | G01F 1/8413 |
| JP | 2003121234 | A | | 4/2003 | |
| RU | 2680107 | C1 | | 2/2019 | |
| WO | WO-2025112253 | A1 | * | 6/2025 | G01F 15/185 |

* cited by examiner

CORIOLIS MASS FLOWMETER USING BUILT-IN SUPPORTING STRUCTURE

CROSS REFERENCE TO RELATED APPLICATIONS

This application is the United State national stage entry under 37 U.S.C. 371 of PCT/CN2022/098041, filed on Jun. 10, 2022, which claims priority to Chinese application number 202210212198.4, filed on Mar. 2, 2022, the disclosure of which are incorporated by reference herein in their entireties.

FIELD OF THE DISCLOSURE

The disclosure relates generally to the Coriolis mass flowmeters. More specifically, the disclosure relates to Coriolis mass flowmeters with built-in supporting structures.

BACKGROUND

In the Coriolis mass flowmeter, a measuring tube is connected to an external pipeline via a flow divider and a flange, and the measuring tube is also isolated from the external environment by the supporting structure and the case. In the prior art, the case is directly welded to the support tube, so that the support tube is partially wrapped inside the case, and other parts or all parts of the support tube are exposed outside the case, and the case does not contact with a transmitter support.

Due to the fact that the supporting structure is an external structure, and is required to provide enough supporting stiffness, there are special requirements on the material, thickness, machining characteristics and accuracy of the supporting structure, leading to high production cost. In addition, the design of the supporting structure may improve the interference resistance of the flowmeter, so that the performance of flowmeter will be limited if the production cost of the supporting structure is high.

SUMMARY

The following presents a simplified summary of the invention in order to provide a basic understanding of some aspects of the invention. This summary is not an extensive overview of the invention. It is not intended to identify critical elements or to delineate the scope of the invention. Its sole purpose is to present some concepts of the invention in a simplified form as a prelude to the more detailed description that is presented elsewhere.

In some embodiments, the disclosure provides a Coriolis mass flowmeter with a built-in supporting structure. The Coriolis mass flowmeter includes a first flow divider, a second flow divider, a support tube, a first case, a second case, a transmitter support, and a flow tube.

One end of the flow tube is connected to the first flow divider, and another end of the flow tube is connected to the second flow divider. The first flow divider and second flow divider are fixed by the support tube. The first case is located on the front side of the Coriolis mass flowmeter and is connected to the first flow divider and the second flow divider. The second case is located on the back side of Coriolis mass flowmeter and is connected to the first flow divider and the second flow divider. The first case is connected to the second case, and the transmitter support is connected to the first case and the second case. The first case and the second case are wrapped around the support tube and the flow tube.

Optionally, the first case is connected to the second case by autogenous fusion welding.

Optionally, the Coriolis mass flowmeter further includes a first flange and a second flange, and the first flange and the second flange are connected to the first flow divider and the second flow divider, respectively.

Optionally, the support tube is made from stainless steel or carbon steel.

Optionally, the support tube has a wall thickness of 1 mm to 25 mm.

BRIEF DESCRIPTION OF THE DRAWINGS

Illustrative embodiments of the present disclosure are described in detail below with reference to the attached drawing figures.

DETAILED DESCRIPTION

The following describes some non-limiting exemplary embodiments of the invention with reference to the accompanying drawings. The described embodiments are merely a part rather than all of the embodiments of the invention. All other embodiments obtained by a person of ordinary skill in the art based on the embodiments of the disclosure shall fall within the scope of the disclosure.

Figure 1:
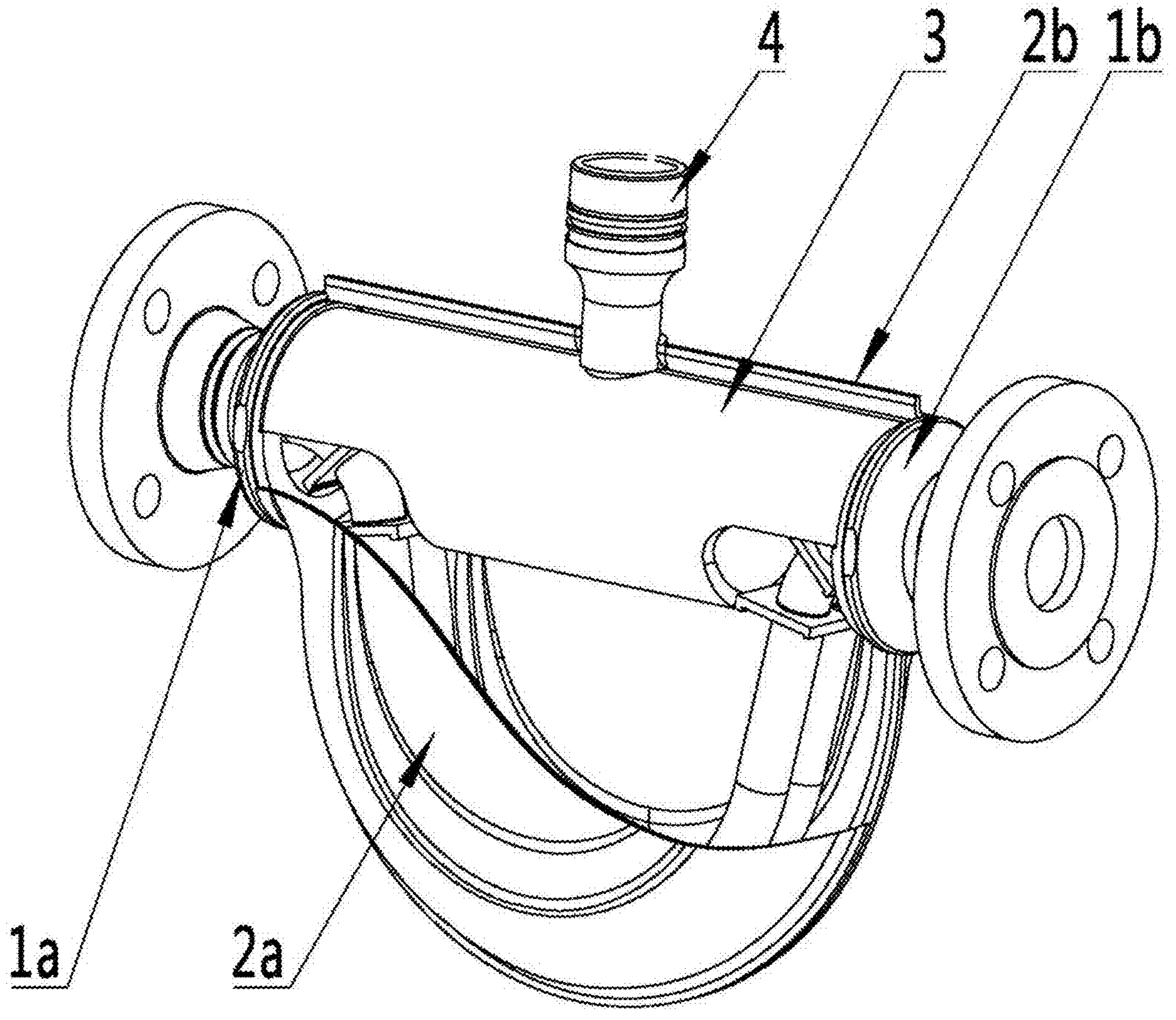
FIG. 1 shows a first structural diagram of a Coriolis mass flowmeter according to an embodiment of the disclosure.
Figure 2:
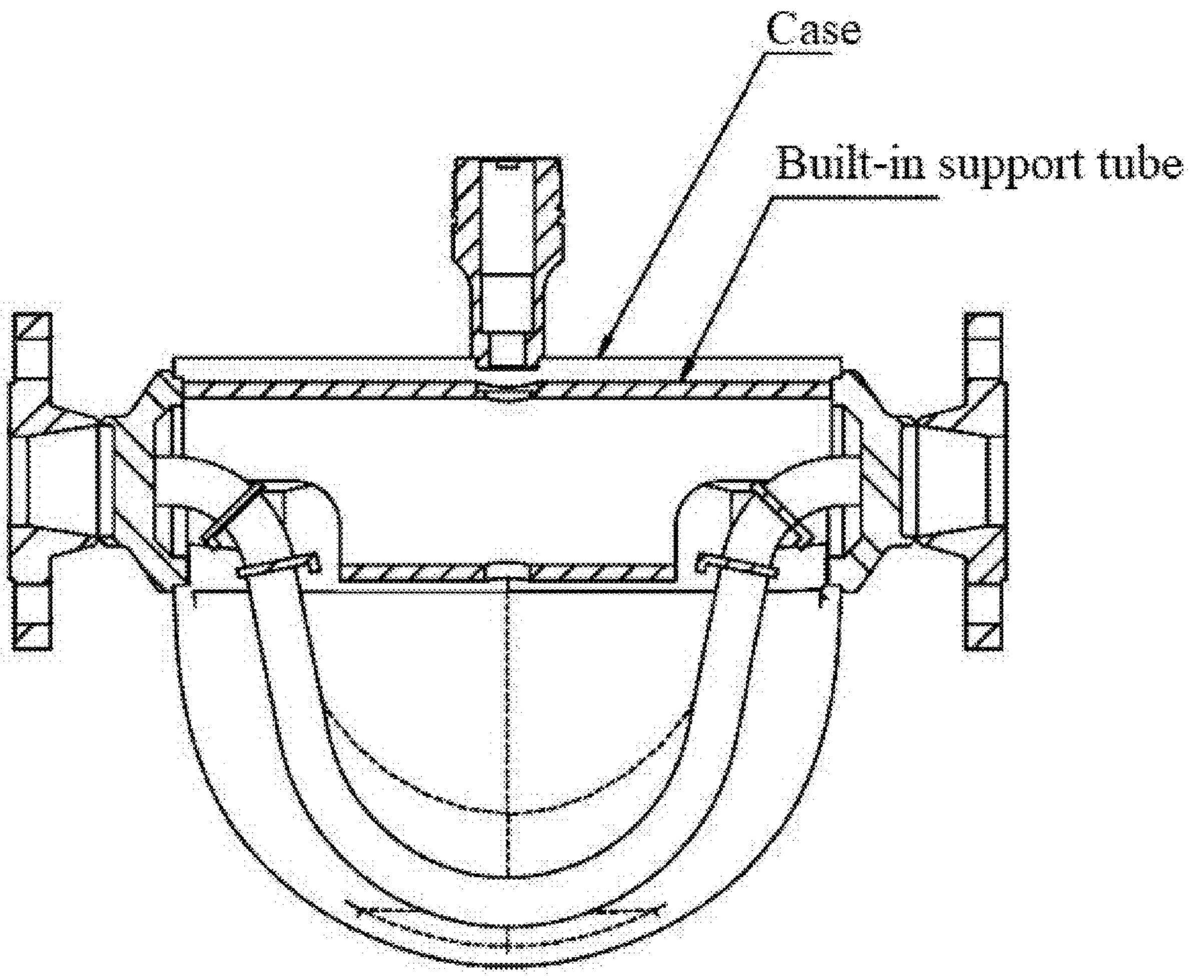
FIG. 2 shows a second structural diagram of the Coriolis mass flowmeter according to an embodiment of the disclosure.

In some embodiments, the disclosure provides a Coriolis mass flowmeter with a non-circular cross section, as shown in FIG. 1 and FIG. 2. The Coriolis mass flowmeter may include a first flow divider (1*a*), a second flow divider (1*b*), a support tube (3), a first case (2*a*), a second case (2*b*), a transmitter support (4), and a flow tube.

One end of the flow tube is connected to the first flow divider, and an other end of the flow tube is connected to the second flow divider.

The first flow divider and the second flow divider are fixed by the support tube.

The first case is located on a front side of the Coriolis mass flowmeter and is connected to the first flow divider and the second flow divider.

The second case is located on a back side of Coriolis mass flowmeter and is connected to the first flow divider and the second flow divider.

The first case is connected to the second case, and the transmitter support is connected to the first case and the second case.

The first case and the second case are wrapped around the support tube and the flow tube.

Compared with the prior art, a welding seam between a transverse case and the supporting structure may be omitted. In addition, autogenous fusion welding is adopted for the welding between the cases in the present disclosure, while in the prior art, filler welding is adopted for the welding between the case and the support tube. The autogenous fusion welding generates less heat than the filler welding, so that the welding stress is reduced, and the negative impact on the product performance caused by the welding stress transmitted to a measurement area is effectively reduced.

Compared with the prior art, the structure of the case in the present disclosure may enhance the stiffness of the case affecting the vibration frequency, so that the vibration frequencies of the case in a vibration mode and a driving mode may be effectively separated, thus reducing the noise generated by the vibration of the case.

Optionally, the Coriolis mass flowmeter further may include a first flange and a second flange. The first flange and the second flange are connected to the first flow divider and the second flow divider, respectively. In the prior art, the axial strength of the flange mainly depends on the strength of the support tube, but in the present disclosure, the case is wrapped around the support tube, which is equivalent to adding a layer of annular structure on the outside the support tube, thus enhancing the axial strength of the flange.

As the support tube in the present disclosure is completely wrapped inside the case, there is a wider choice of materials for the new supporting structure, such as low-standard stainless steel or carbon steel. In addition, the requirement of the machining accuracy of the new supporting structure may be reduced, and some machining features of the new supporting structure may not be omitted. The supporting structure may be made from a thicker material to improve the stability of measurement. Finally, a welding area between the case and the supporting structure is reduced, so that the transmission of the welding stress to the measurement area may be reduced.

This design solution may be applicable to both a built-in support tube with the circular cross section and a support tube with the rectangular cross section or other arbitrary shapes.

A suitable wall thickness of the support tube is 1 mm to 25 mm. The thicker the wall thickness, the lower the vibration noise of the case. However, the thicker wall thickness of the support tube also brings waste of resources and increase of product weight.

Except for the flow tubes with conventional caliber (great than or equal to 10 mm and less than or equal to 100 mm), this design solution is also applicable to both flow tubes with smaller caliber (less than 10 mm) and flow tubes with larger caliber (great than 100 mm).

Meanwhile, this design solution may be applicable to design requirements of multiple different Coriolis mass flowmeters, for example, different flow tube spacing and different transmitter support flange positions.

For those skilled in the art, apparently, the present disclosure is not limited to details of the exemplary embodiments, and may be expressed in other specific forms without departing from the spirit or basic characteristics of the present disclosure. Therefore, in any way, the embodiments should be regarded as exemplary, not limitative; and the scope of the present disclosure is limited by the appended claims, instead of the above description. Thus, all variations intended to fall into the meaning and scope of equivalent elements of the claims should be covered within the present disclosure. Any reference signs in the claims shall not be regarded as limitations to the concerned claims.

Various embodiments of the disclosure may have one or more of the following effects. In some embodiments, the disclosure provides a new full-wrapping design solution. Two flow dividers may be connected together by a metal support tube in the form of welding, and the support tube may be entirely wrapped inside the case. The full-wrapping design solution may effectively reduce the negative impact on the product performance which is caused by a welding stress generated during case welding and transmitted to a measurement area, and may also greatly enhance the axial strength of the flange. Vibration frequencies of the case in a vibration mode and a driving mode may be effectively separated, which may help to reduce the noise generated by the vibration of the case.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Unless indicated otherwise, not all steps listed in the various figures need be carried out in the specific order described.

What is claimed is:

1. A Coriolis mass flowmeter with a built-in supporting structure, comprising a first flow divider, a second flow divider, a support tube, a first case, a second case, a transmitter support, and a flow tube, wherein:

one end of the flow tube is connected to the first flow divider, and another end of the flow tube is connected to the second flow divider;

the first flow divider and the second flow divider are fixed by the support tube;

the first case is located on a front side of the Coriolis mass flowmeter and is connected to the first flow divider and the second flow divider;

the second case is located on a back side of the Coriolis mass flowmeter and is connected to the first flow divider and the second flow divider;

the first case is connected to the second case, and the transmitter support is connected to the first case and the second case; and the first case and the second case are wrapped around the support tube and the flow tube.

2. The Coriolis mass flowmeter according to claim 1, wherein the first case is connected to the second case by autogenous fusion welding.

3. The Coriolis mass flowmeter according to claim 1, wherein:

the Coriolis mass flowmeter further comprises a first flange and a second flange;

the first flange is connected to the first flow divider; and the second flange are connected the second flow divider.

4. The Coriolis mass flowmeter according to claim 1, wherein the support tube is made of stainless steel or carbon steel.

5. The Coriolis mass flowmeter according to claim 1, wherein the support tube has a wall thickness of 1 mm to 25 mm.

* * * * *